US008704870B2

(12) United States Patent
Kulkarni et al.

(10) Patent No.: US 8,704,870 B2
(45) Date of Patent: Apr. 22, 2014

(54) MULTIWAY TELEPRESENCE WITHOUT A HARDWARE MCU

(75) Inventors: Hrishikesh G. Kulkarni, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 986 days.

(21) Appl. No.: 12/779,424

(22) Filed: May 13, 2010

(65) Prior Publication Data

US 2011/0279632 A1    Nov. 17, 2011

(51) Int. Cl.
*H04N 7/14*        (2006.01)
(52) U.S. Cl.
USPC .................................. 348/14.09; 379/202.01
(58) Field of Classification Search
USPC ................... 379/93.21, 158, 202.01, 205.01;
370/260–266; 455/416;
348/14.08–14.1, 211.12
See application file for complete search history.

(56) References Cited

U.S. PATENT DOCUMENTS

| | | | |
|---|---|---|---|
| 5,657,096 A | 8/1997 | Lukacs | |
| 5,675,374 A | 10/1997 | Kohda | |
| 7,692,683 B2 | 4/2010 | Kenoyer et al. | |
| 7,707,247 B2 | 4/2010 | Dunn et al. | |
| 2006/0106929 A1 | 5/2006 | Kenoyer et al. | |
| 2006/0248210 A1* | 11/2006 | Kenoyer | 709/231 |
| 2007/0188599 A1* | 8/2007 | Kenoyer | 348/14.08 |
| 2008/0316296 A1 | 12/2008 | King et al. | |
| 2009/0174764 A1* | 7/2009 | Chadha et al. | 348/14.09 |
| 2010/0085419 A1 | 4/2010 | Goyal et al. | |
| 2011/0093273 A1* | 4/2011 | Lee et al. | 704/270 |

OTHER PUBLICATIONS

"Cisco TelePresence Multipoint Switch"; Cisco Systems; 2008; 5 pages.
"Cisco TelePresence System 3000"; Cisco Systems: Obtained from the Internet: <http://www.cisco.com/en/US/products/ps8333/>; Jul. 30, 2010; 1 page.
"Tandberg Telepresence T3/T1"; Tandberg; Oct. 2009; 2 pages.
Gautam Knot, Prithvi Ranganath, Reghuram Belur, and Sandeep Lakshmipathy; U.S. Appl. No. 12/619,426; "Determining a Videoconference Based on Numbers of Participants"; Nov. 16, 2009; 35 pages.

* cited by examiner

*Primary Examiner* — Md S Elahee
*Assistant Examiner* — Akelaw Teshale
(74) *Attorney, Agent, or Firm* — Meyertons Hood Kivlin Kowert & Goetzel, P.C.; Jeffrey C. Hood; Joel L. Stevens

(57) ABSTRACT

System and method for performing a videoconference. The videoconference may be established between at least three videoconferencing locations. Each videoconferencing location may include respective pluralities of displays, video inputs, and videoconferencing units. A first videoconferencing unit at a first videoconferencing location may receive an indication that there is an active talker at the first videoconferencing location. An indication that there is an active talker at the first videoconferencing location may also be provided to a second videoconferencing unit at the first videoconferencing location. The first and second videoconferencing units may provide signals to corresponding videoconferencing units at second and third videoconferencing locations indicating that videoconferencing signals from the first videoconferencing location should be displayed. The second and third videoconferencing locations may switch to display videoconferencing signals from the first videoconferencing location based on the signals which indicate that videoconferencing signals from the first videoconferencing location should be displayed.

20 Claims, 7 Drawing Sheets

MULTIWAY TELEPRESENCE WITHOUT A HARDWARE MCU

FIELD OF THE INVENTION

The present invention relates generally to videoconferencing and, more specifically, to a method for conducting a multiway telepresence videoconference without using a hardware MCU.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant, as well as a display and speaker(s) to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference).

An emerging trend in videoconferencing is to utilize multiple displays and/or multiple cameras at one or more locations of a videoconference. A multi-way multi-screen telepresence setup typically requires the use of a hardware multipoint conferencing unit (MCU) in order to perform the audio/video switching and mixing necessary for such videoconferences to happen. However, these dedicated MCU systems are expensive and hence increase the cost of the multi-screen telepresence deployments significantly. Accordingly, improvements in videoconferencing are desired.

SUMMARY OF THE INVENTION

Various embodiments are presented of a system and method for performing a multi-screen, multi-way videoconference. The system may include a plurality of videoconferencing locations, each videoconferencing location including at least one videoconferencing endpoint. Each videoconferencing endpoint may include at least a subset of a videoconferencing codec, a display, a video input, a speaker, and an audio input. At least one videoconferencing location may include a plurality of endpoints, e.g., including a plurality of videoconferencing units (e.g., codecs), a plurality of displays coupled to respective ones of the videoconferencing units, a plurality of video inputs coupled to respective ones of the videoconferencing units, and one or more audio inputs coupled to one or more of the plurality of videoconferencing units. The system, or a portion thereof (e.g., a single location), may be configured to perform the method, as described below. In some embodiments, it may be the case that a dedicated hardware MCU is not required at the videoconferencing locations involved in the videoconference.

A videoconference may be established, at a first videoconferencing location, between at least three videoconferencing locations (e.g., two other videoconferencing locations). The first videoconferencing location may include a plurality of displays, a plurality of corresponding video inputs, and a plurality of corresponding videoconferencing units (e.g., codecs). In some embodiments, the first videoconferencing location may also include a plurality of corresponding audio inputs. The audio inputs may be coupled to mixer (e.g., an audio mixer), which may be coupled to each of the plurality of videoconferencing units. Second and third videoconferencing locations may also each include multiple endpoints, e.g., including respective pluralities of displays, respective pluralities of corresponding video inputs, respective pluralities of corresponding videoconferencing units, and in some embodiments respective pluralities of corresponding audio inputs and a mixer. Alternatively (or in addition), one or more of the videoconferencing locations may include only one endpoint.

In some embodiments (for example, in which each videoconferencing location includes a plurality of endpoints), a first videoconferencing unit at the first videoconferencing location may communicate only with corresponding first videoconferencing units at other respective locations. Likewise, a second videoconferencing unit at the first videoconferencing location may communicate only with corresponding second videoconferencing units at other respective locations. The first and second videoconferencing units at the first videoconferencing location may thus selectively display, on their respective displays, videoconferencing information from respective ones of the corresponding videoconferencing units at other respective locations, based on audio output from the other respective locations.

Furthermore, in some embodiments, the first videoconferencing unit at the first videoconferencing location may act as a first videoconference host for respective first videoconferencing units at the second and third videoconferencing locations. Likewise, the second videoconferencing unit at the first videoconferencing location may act as a second videoconference host for respective second videoconferencing units at the second and third videoconferencing locations.

An audio input signal may be received from a first participant. The audio input signal may be received by the first videoconferencing unit at the first videoconferencing location. In some embodiments, the audio input signal may be received by a first audio input (e.g., corresponding to the first videoconferencing unit), which may provide the audio input signal to the first videoconferencing unit. In some embodiments, the first audio input may provide the audio input signal to the mixer, which may provide the audio input signal to the first videoconferencing unit. The audio input signal from the first participant may provide an indication to the first videoconferencing unit at the first videoconferencing location that there is an active talker at the first videoconferencing location.

An indication may be provided to a second videoconferencing unit at the first videoconferencing location that there is an active talker at the first videoconferencing location. In some embodiments, the indication may be provided by the first videoconferencing unit at the first videoconferencing location, e.g., in response to receiving the audio input from the first participant. For example, the first videoconferencing unit may provide an interrupt signal to the second videoconferencing unit, e.g., indicating to the second videoconferencing unit that videoconferencing units at other participant locations should be informed that videoconferencing signals from the first videoconferencing location should be displayed (e.g., because there is an active talker at the first videoconferencing location).

Alternatively, in some embodiments, the second videoconferencing unit at the first videoconferencing location may also receive the audio input from the first participant. Thus, in such embodiments, receiving the audio input from the first participant may provide the indication to the second videoconferencing unit at the first videoconferencing location that there is an active talker at the first videoconferencing location;

Signals may be provided, by the first and second videoconferencing units at the first videoconferencing location, to corresponding videoconferencing units at the second and third videoconferencing locations which indicate that videoconferencing signals from the first videoconferencing location should be displayed, in response to there being an active talker at the first videoconferencing location.

The second and third videoconferencing locations may switch to display videoconferencing signals from the first videoconferencing location based on the signals which indicate that videoconferencing signals from the first videoconferencing location should be displayed.

In some embodiments (for example, in which each videoconferencing location includes three or more endpoints), an indication that there is an active talker at the first videoconferencing location may also be provided to a third videoconferencing unit at the first videoconferencing location. In this case, the third videoconferencing unit at the first videoconferencing location may also provide signals to corresponding videoconferencing units (e.g., third videoconferencing units) at the second and third videoconferencing locations which indicate that videoconferencing signals from the first videoconferencing location should be displayed, e.g., in response to there being an active talker at the first video conferencing location.

In further embodiments, instead of providing indications from the first location to the other locations to switch to displaying signals from the first location, the other locations may simply identify that there is an active speaker, e.g., by analyzing audio signals from each videoconferencing unit at the first location.

A further set of embodiments for performing a videoconference are also contemplated. The videoconference may be established (e.g., at a first videoconferencing location) between at least three videoconferencing locations. Similarly as described above, at least the first videoconferencing location, and in some embodiments each of the videoconferencing locations, may include multiple endpoints. Each endpoint at the first location may include a corresponding audio input. The audio inputs may be coupled to a mixer (e.g., an audio mixer), which may be coupled to the videoconferencing units of the first location. Other respective locations may include similar or different audio configurations.

Each audio input may receive a respective audio input signal. The audio inputs may be unidirectional, e.g., may be configured to receive audio input signals only from a specific area of the videoconferencing location. Furthermore, in some embodiments, the audio inputs at the first location may be configured such that the audio coverage areas of the audio inputs at the first location may include minimal or no overlap, such that an audio input signal received by a first audio input at the first videoconferencing location may substantially not be received by a second audio input at the first videoconferencing location, even if the first and second audio input are located in relatively close proximity to each other.

The audio input signals from the audio inputs at the first location may be provided to the mixer. The mixer may thus receive the audio input signals and mix the received audio input signals to produce a mixed audio signal. The mixed audio signal may retain information indicating that respective portions of the mixed audio signal are received from respective ones of the plurality of audio inputs.

The mixed audio signal may be provided to each of the plurality of videoconferencing units at the first videoconferencing location. In some embodiments, provision of the mixed audio signal to each of the plurality of videoconferencing units may be performed directly by the mixer. For example, the mixer may be coupled to each of the videoconferencing units. Alternatively, in some embodiments the mixer may provide the mixed audio signal to a subset (e.g., one) of the videoconferencing, which may provide the mixed audio signal to the remaining videoconferencing units at the first videoconferencing location.

Thus, the first videoconferencing unit at the first videoconferencing location may receive an audio input signal from a first videoconference participant. The first videoconferencing unit at the first videoconferencing location may determine that the portion of the mixed audio signal received from the audio input corresponding to the first videoconferencing unit includes the audio input signal from the first participant. In response to this determination, the first videoconferencing unit at the first videoconferencing location may then provide signals to corresponding videoconferencing units at the second and third videoconferencing locations which indicate that videoconferencing signals from the first videoconferencing unit at the first videoconferencing location should be displayed, e.g., in response receiving the audio input signal from the first participant.

The corresponding videoconferencing units (e.g., corresponding to the first videoconferencing unit at the first videoconferencing location) at the second and third videoconferencing locations may switch their respective displays to display videoconferencing signals from the first videoconferencing unit at the first videoconferencing location, e.g., based on the signals which indicate that videoconferencing signals from the first videoconferencing unit at the first videoconferencing location should be displayed.

In some embodiments, each respective one of the plurality of videoconferencing units at the first videoconferencing location (e.g., including the first videoconferencing unit, as described above) may determine whether the portion of the mixed audio signal from a corresponding respective audio input includes an audio input signal from a conference participant. Thus, if the audio input signal from the first participant is received by the audio input corresponding to the first videoconferencing unit at the first videoconferencing location, any other videoconferencing units at the first videoconferencing location may determine that their corresponding respective audio inputs did not receive the audio input signal from the first participant. Accordingly, videoconferencing units at the second and third videoconferencing locations which do not correspond to the first videoconferencing unit at the first videoconferencing location (e.g., videoconferencing units at the second and third videoconferencing locations which correspond to other videoconferencing units at the first videoconferencing location) may not receive signals indicating that videoconferencing signals from the first videoconferencing unit at the first videoconferencing location should be displayed from the first videoconferencing location in response to the first videoconferencing unit receiving the audio input signal from the first participant.

BRIEF DESCRIPTION OF THE DRAWINGS

A better understanding of the present invention may be obtained when the following detailed description is considered in conjunction with the following drawings, in which.

Figure 1:
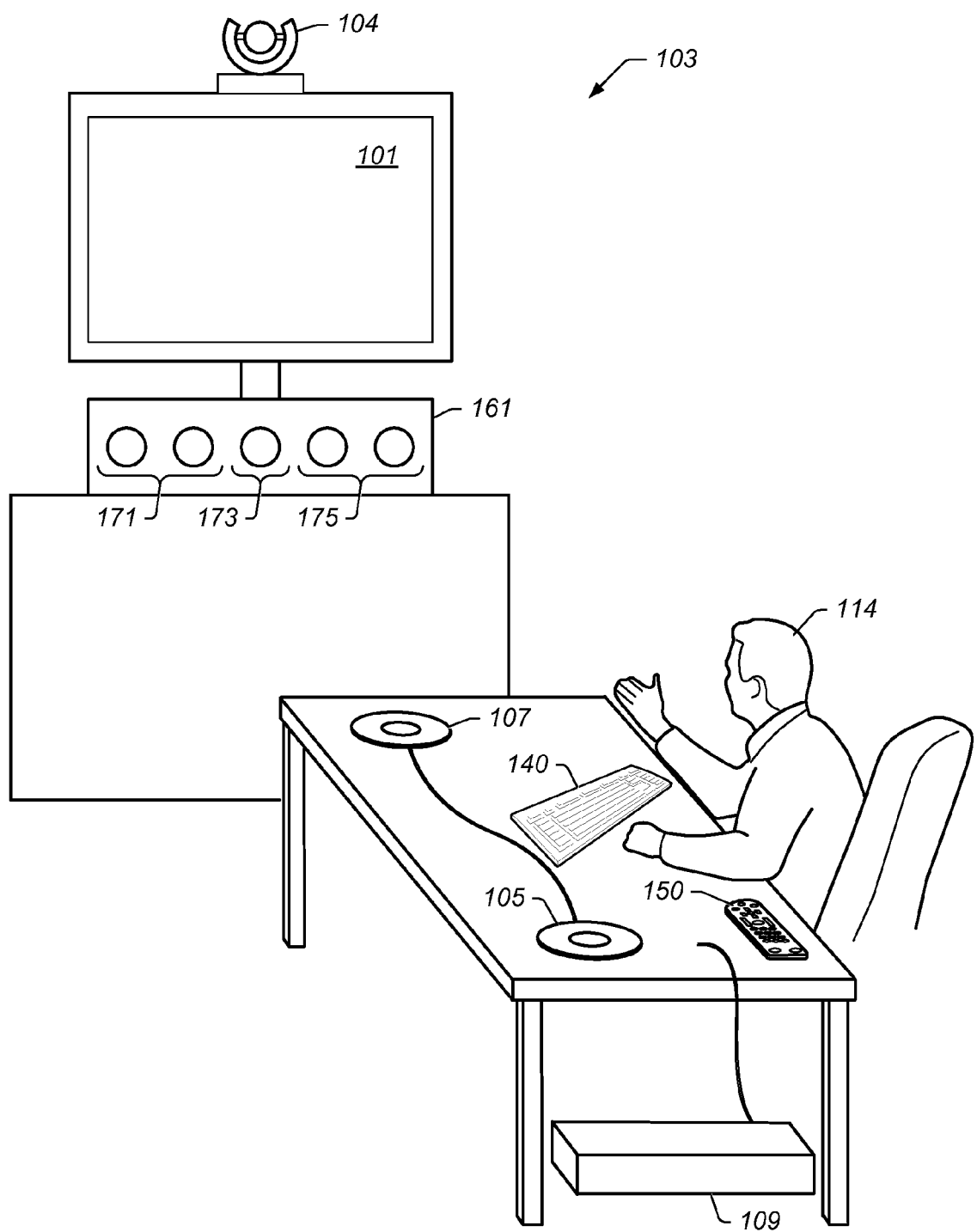
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Figure 2:

FIGS. 1 and 2—Exemplary Participant Locations

FIG. 1 illustrates an exemplary embodiment of a videoconferencing participant location including a single endpoint. The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

The videoconferencing systems 103 and 200 are shown as including a single endpoint (e.g., a single codec, display, camera, etc.). In a multi-screen telepresence setup, a videoconferencing location might include multiple such endpoints. For example, a common telepresence setup includes three displays, with corresponding cameras, codecs, and/or other equipment, as desired. The three displays may be placed side-by-side to provide a more realistic feeling of being in the same room for the videoconference participants at each location. Other numbers of endpoints per location and other display setups are also contemplated.

Figure 3:
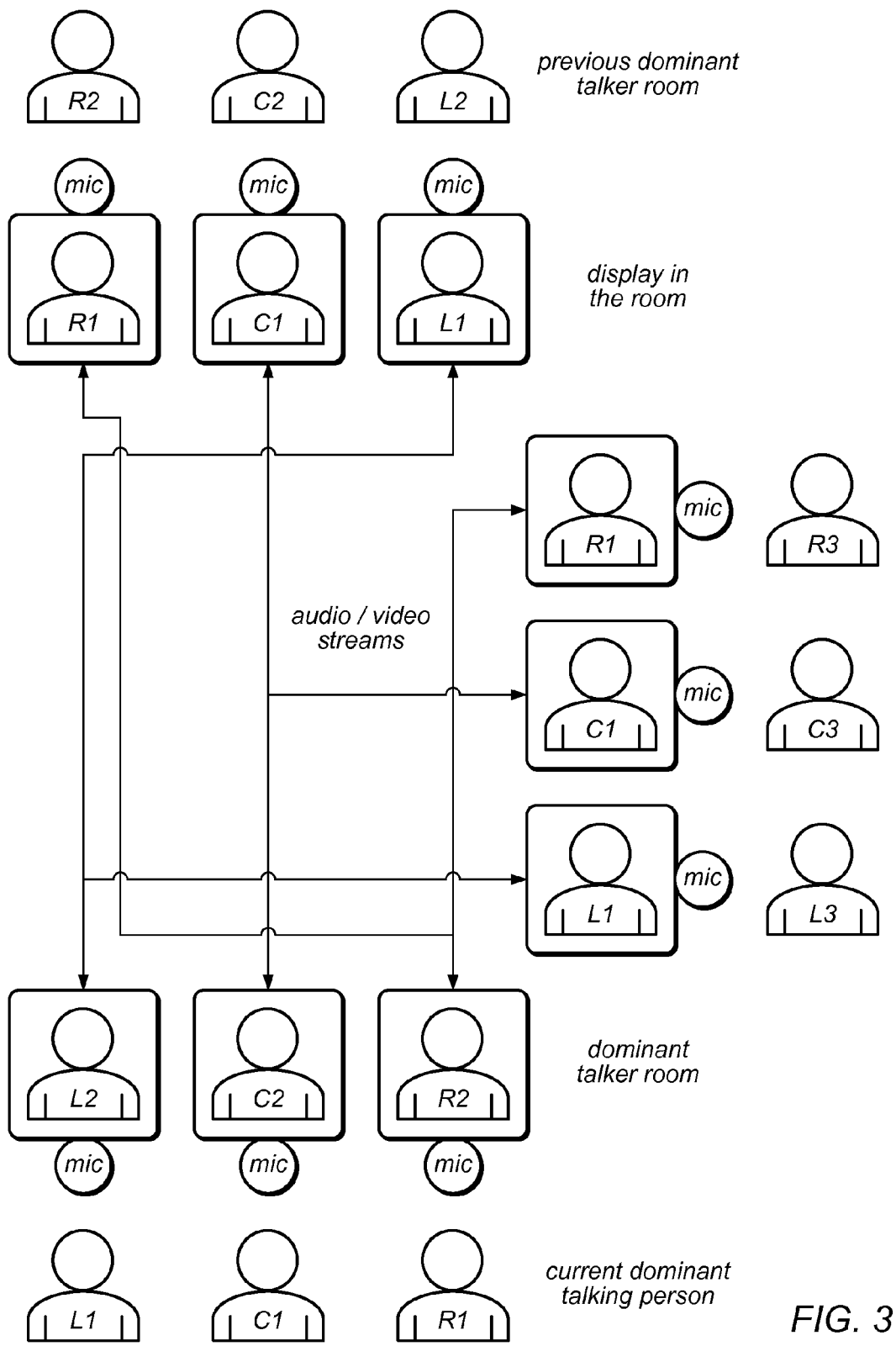
FIG. 3 illustrates a multi-way multi-screen telepresence setup according to one embodiment.

FIG. 3—Coupled Conferencing Systems

FIG. 3 illustrates a multi-screen multi-way telepresence configuration of videoconferencing systems according to one embodiment. The conferencing systems may be operable to perform the methods described herein. As shown, each conferencing location may include multiple endpoints. Thus, the first location may include participant endpoints L1, C1, and R1, while the second and third locations may include participant endpoints L2, C2, R2, and L3, C3, R3 respectively. Each endpoint may include a conferencing unit, such as shown in and described with respect to FIGS. 1 and 2 according to various embodiments. In the exemplary embodiment shown, there are three locations (e.g., rooms), each including three endpoints.

Each endpoint at each location may be coupled to one or more respective endpoints at the other videoconferencing locations. In some embodiments, the endpoints (e.g., the endpoints' codecs) at one location may act as hosts for the respective endpoints at the other locations to which they are coupled. For example, in the exemplary configuration shown in FIG. 3, the endpoints at the first location may act as the host endpoints. Thus, the L2 and L3 endpoints at the second and third locations may both couple to the L1 endpoint, while the C2 and C3 endpoints couple to the C1 endpoint, and the R2 and R3 endpoints couple to the R1 endpoint. In other words, in some embodiments, the telepresence setup shown in FIG. 3 may be accomplished as three separate (but potentially coupled, e.g., as described below) videoconferences.

The endpoints at each location may also be coupled to each other in any of a variety of ways. For example, the codecs of the endpoints at each location may communicate with each other, e.g., in order to determine initial routing of connections between locations. As another example, embodiments are contemplated in which the codecs of the endpoints at each location may each be coupled to an audio mixer, where the audio mixer is configured to mix together audio signals from the endpoints at that location, such that each codec may receive a mixed audio signal including all of the audio signals from that codec's location.

Since there may be at least three videoconferencing locations participating in the videoconference, there may be more video input signals than any single location may be capable of displaying. It may be possible to use dedicated multipoint control hardware to create a composite image (also referred to as a continuous presence image) from multiple video inputs, however, this may in some embodiments be an undesirable solution. More specifically, dedicated multipoint control hardware (i.e., that is separate from the videoconferencing units) may typically be relatively expensive, potentially reducing the feasibility of implementing telepresence systems for some organizations. Instead, one or more of the videoconferencing units may act as the MCU.

Accordingly, in some embodiments, a switching scheme may be implemented, e.g., in order that each endpoint may display an appropriate video input signal at any given time. According to some embodiments, the multi-screen multi-way telepresence videoconference illustrated in FIG. 3 may be capable of operating in either a "segment switching mode" or a "site switching mode".

In a segment switching configuration, each endpoint may act as an independent segment for switching purposes. For example, in a segment switching configuration, if a participant begins speaking at a left endpoint at a first location (e.g., L1), the left endpoints at other locations (e.g., L2, L3) may switch their displays to display video input signals from the left endpoint at the first location (L1), while the center and right endpoints at other locations (C2, C3, R2, R3) may not be affected by the participant speaking at the left endpoint at the first location (L1). In other words, only endpoints corresponding to an endpoint affected by a switching condition may switch in response to the switching condition. An endpoint at which a current speaker is located may display a video input signal from a corresponding remote endpoint at which a most recent speaker is located.

In a site switching configuration, the endpoints at each location may switch in a coordinated manner. For example, in a site switching configuration, if a participant begins speaking at a left endpoint at a first location (e.g., L1), the left endpoints at other locations (e.g., L2, L3) may switch their displays to display video input signals from the left endpoint at the first location (L1), while the center and right endpoints (C2, C3, R2, R3) at other locations may switch their displays to display video input signals from the center and right endpoints, respectively, at the first location (C1, R1). In other words, all of the endpoints at a site may switch in response to any switching condition. A site at which a current speaker is located may display video input signals from a site at which a most recent speaker is located.

FIG. 3 illustrates an embodiment of site switching where the current dominant talker is in location 1. Accordingly, locations 2 and 3 are both displaying location 1 on all three screens. Location 1 is displaying the previous dominant talkers of location 2.

Figure 4:
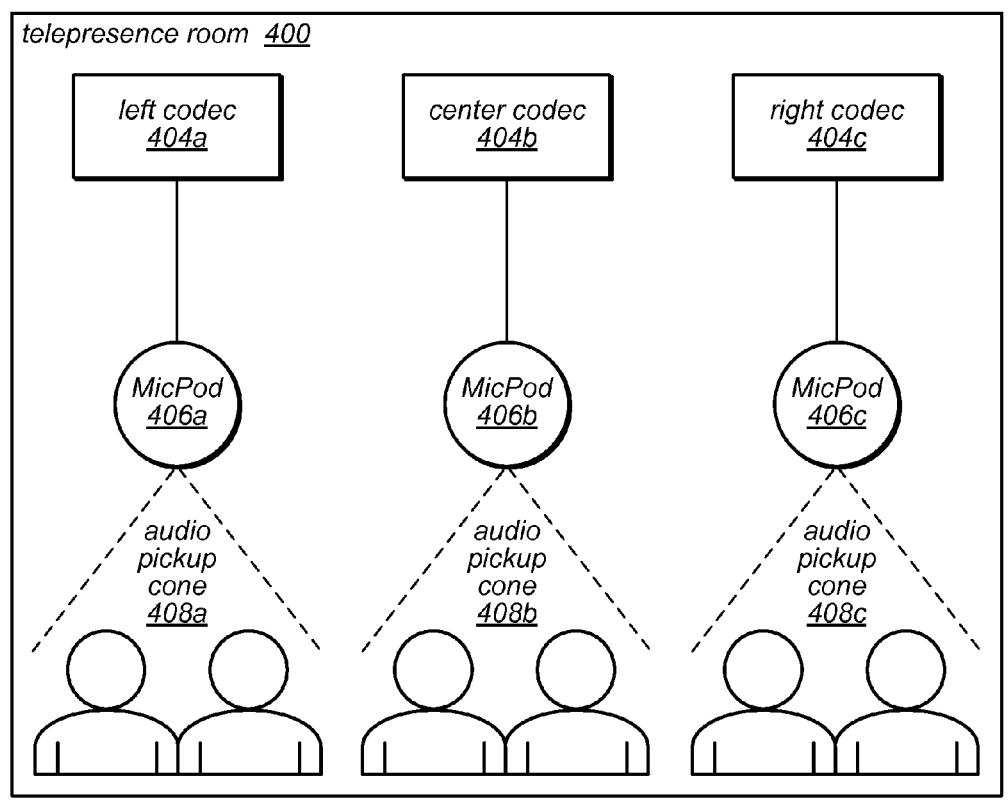
FIGS. 4 and 5 illustrate various embodiments of a three endpoint telepresence room setup.
Figure 5:
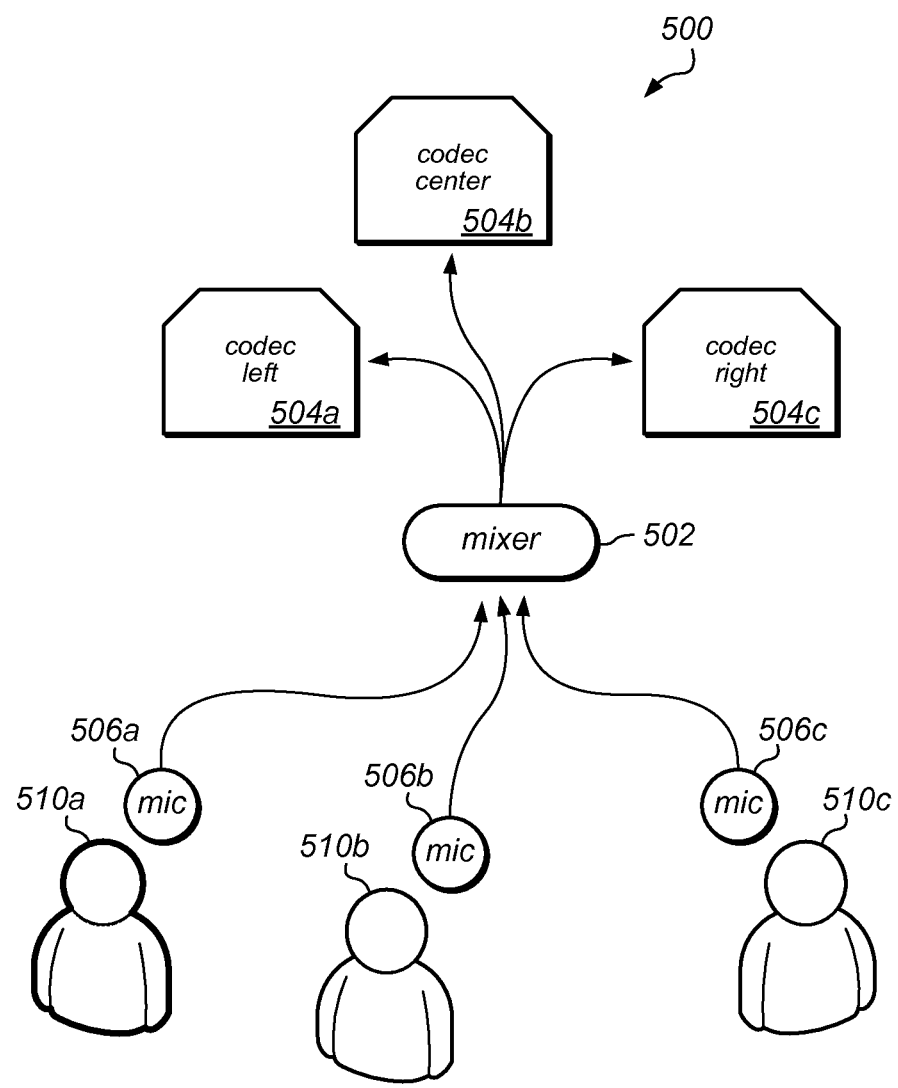

FIGS. 4-5—Telepresence Room Configuration

FIGS. 4-5 illustrate aspects of an exemplary telepresence room configuration according to various embodiments. According to some embodiments, one or more of the videoconferencing locations illustrated in FIG. 3 may be implemented using one or both of the exemplary telepresence room configurations shown in FIGS. 4-5, e.g., to implement a method for performing a videoconference according to any of the various embodiments described below with respect to FIG. 6.

In the embodiment of FIG. 4, the telepresence room 400 may include three endpoints: a "left" endpoint, a "center" endpoint, and a "right" endpoint. Each endpoint may include a codec 404, and an audio input 406, such as a microphone or microphone array. Each endpoint may also include a video input (not shown) such as a video camera, a display (not shown) for displaying videoconferencing information from other locations, and any of various other videoconferencing equipment, as desired.

As shown in FIG. 4, each audio input may be configured as a unidirectional audio input e.g., with a directionally oriented "audio pickup cone" 408. It should be noted that although the audio pickup cones 408 are shown as being essentially cone shaped, the actual shape of the audio pickup cone may be any of a variety of shapes; for example, in some embodiments the actual audio pickup field may a cardioid.

By using a unidirectional audio input configuration for each endpoint at a location, it may be possible to isolate corresponding portions of a telepresence room. In other words, if the audio pickup cones 408 of the audio inputs are substantially non-overlapping, a videoconference participant speaking in the audio pickup cones 408a of corresponding MicPod 406a may not produce a noticeable audio input signal in the other MicPods 406b, 406c. This separation of audio inputs may be important in order to allow for the possibility of a segment-switching videoconference configuration, as will be described below.

In some embodiments, the respective audio inputs 406a, 406b, 406c may provide received audio input signals to their respective codecs 404a, 404b, 404c directly as shown in FIG. 4. Alternatively, in some embodiments it may be preferable that the respective audio inputs 406a, 406b, 406c provide received audio input signals to a mixer. An exemplary such embodiment is shown in FIG. 5.

In FIG. 5, participants 510a-c are located within the respective audio pickup cones of audio inputs (e.g., microphone) 506a-c in telepresence room 500. Thus, if participant 510a speaks, audio input 506a should receive an audio input signal, while audio inputs 506b, 506c should not. However, the audio input signals from each of the audio inputs 506a-c may be provided to a mixer 502, which may be configured to mix the received audio input signals to produce a mixed audio signal. The mixed audio signal may retain information indicating from which audio input which audio input signal is received; for example, the mixed audio signal may include respective channels for each of audio inputs 506a-c.

The mixer 502 may further be configured to provide the mixed audio signal to one or more of the codecs in the telepresence room. For example, as shown, the mixer 502 may be configured to provide the mixed audio signal to each of the left codec 504a (e.g., corresponding to the audio input 506a), the center codec 504b (e.g., corresponding to the audio input 506b), and the right codec 504c (e.g., corresponding to the audio input 506c).

Alternatively, in some embodiments the mixer 502 may be configured to provide the mixed audio signal to a subset of the codecs in the telepresence room 500. For example, in some embodiments the mixer 502 may only provide the mixed audio signal to the center codec 504b, which may then provide the mixed audio signal (or a portion thereof) to the left codec 504a and the right codec 504c.

Figure 6A:
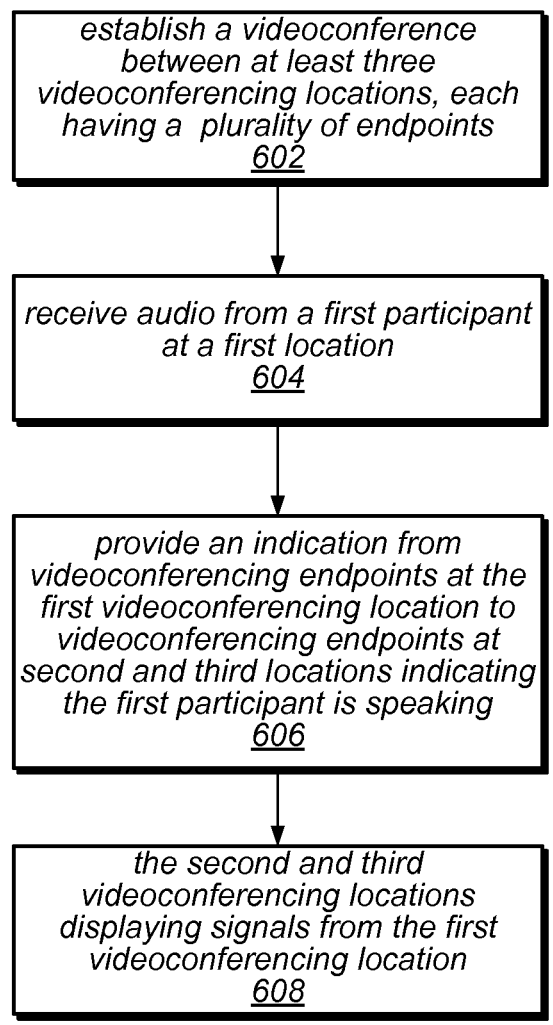
FIGS. 6A and 6B are flowchart diagrams illustrating exemplary methods for performing video signal switching in a multi-way multi-screen videoconference, according to some embodiments.
Figure 6B:
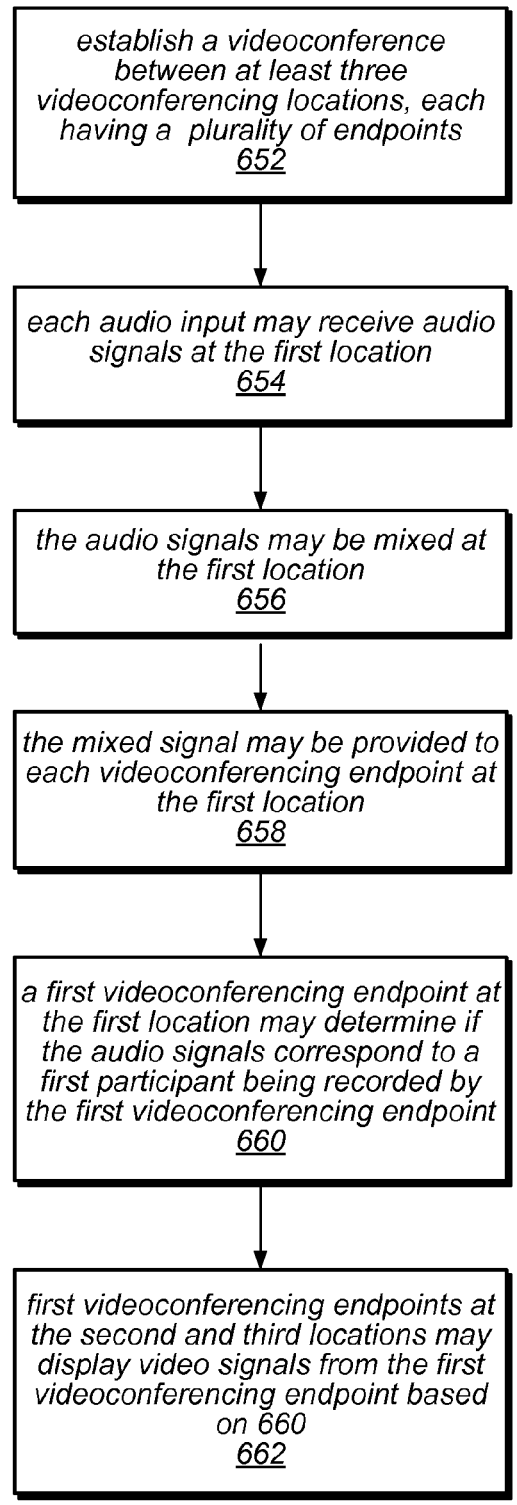

Each codec may be configured to determine, from the mixed audio signal, whether or not its corresponding audio input is receiving an audio signal (e.g., from a participant speaking). This may allow the codec to determine whether a switching condition has occurred. Alternatively, one codec at a location may operate as a "master" codec, and may provide an indication whether a switching condition FIGS. 6a and 6b—Conducting a Multi-Way Multi-Screen Videoconference FIGS. 6A and 6B illustrate embodiments of a method for conducting a multi-way multi-screen videoconference. The methods shown in FIGS. 6A and 6B may be used in conjunction with any of the computer systems or devices shown in the above Figures, among other devices. For example, the methods of FIGS. 6A and 6B may apply to an embodiment where a videoconference is conducted between a plurality of videoconferencing locations, each videoconferencing location including at least one videoconferencing endpoint. Each videoconferencing endpoint may include at least a subset of a videoconferencing codec, a display, a video input, a speaker, and an audio input. At least one videoconferencing location may include a plurality of endpoints, e.g., including a plurality of videoconferencing units (e.g., codecs), a plurality of displays coupled to respective ones of the videoconferencing units, a plurality of video inputs coupled to respective ones of the videoconferencing units, and one or more audio inputs coupled to one or more of the plurality of videoconferencing units. The system, or a portion thereof (e.g., a single location), may be configured to perform the method, as described below. In some embodiments, it may be the case that a dedicated hardware MCU is not required at the videoconferencing locations involved in the videoconference.

In various embodiments, some of the method elements shown may be performed concurrently, performed in a different order than shown, or omitted. Additional method elements may also be performed as desired. As shown, the method may operate as follows.

In 602, the videoconference may be established, at a first videoconferencing location, between at least three videoconferencing locations (e.g., at least two other videoconferencing locations). The first videoconferencing location may include a plurality of displays, a plurality of corresponding video inputs, and a plurality of corresponding videoconferencing units (e.g., codecs). In some embodiments, the first videoconferencing location may also include a plurality of corresponding audio inputs. The audio inputs may be coupled to mixer (e.g., an audio mixer), which may be coupled to each of the plurality of videoconferencing units. Second and third videoconferencing locations may also include multiple endpoints, e.g., including respective pluralities of displays, respective pluralities of corresponding video inputs, respective pluralities of corresponding videoconferencing units, and in some embodiments respective pluralities of corresponding audio inputs and a mixer. Alternatively (or in addition), one or more of the videoconferencing locations may include only one endpoint.

In some embodiments (for example, in which each videoconferencing location includes a plurality of endpoints), a first videoconferencing unit at the first videoconferencing location may communicate only with corresponding first videoconferencing units at other respective locations. Likewise, a second videoconferencing unit at the first videoconferencing location may communicate only with corresponding second videoconferencing units at other respective locations. The first and second videoconferencing units at the first videoconferencing location may thus selectively display, on their respective displays, videoconferencing information from respective ones of the corresponding videoconferencing units at other respective locations, based on audio output from the other respective locations.

Furthermore, in some embodiments, the first videoconferencing unit at the first videoconferencing location may act as a first videoconference host for respective first videoconferencing units at the second and third videoconferencing locations. Likewise, the second videoconferencing unit at the first videoconferencing location may act as a second videoconference host for respective second videoconferencing units at the second and third videoconferencing locations.

In 604, an audio input signal may be received from a first participant. The audio input signal may be received by the first videoconferencing unit at the first videoconferencing location. In some embodiments, the audio input signal may be received by a first audio input (e.g., corresponding to the first videoconferencing unit), which may provide the audio input signal to the first videoconferencing unit. In some embodiments, the first audio input may provide the audio input signal to the mixer, which may provide the audio input signal to the first videoconferencing unit. The audio input signal from the first participant may provide an indication to the first videoconferencing unit at the first videoconferencing location that there is an active talker at the first videoconferencing location.

In some embodiments, an indication may be provided to a second videoconferencing unit at the first videoconferencing location that there is an active talker at the first videoconferencing location. In some embodiments, the indication may be provided by the first videoconferencing unit at the first videoconferencing location, e.g., in response to receiving the audio input from the first participant. For example, the first videoconferencing unit may provide an interrupt signal to the second videoconferencing unit, e.g., indicating to the second videoconferencing unit that videoconferencing units at other participant locations should be informed that videoconferencing signals from the first videoconferencing location should be displayed (e.g., because there is an active talker at the first videoconferencing location).

Alternatively, in some embodiments, the second videoconferencing unit at the first videoconferencing location may also receive the audio input from the first participant. Thus, in such embodiments, receiving the audio input from the first participant may provide the indication to the second videoconferencing unit at the first videoconferencing location that there is an active talker at the first videoconferencing location;

In 606, signals may be provided, by the first and second videoconferencing units at the first videoconferencing location, to corresponding videoconferencing units at the second and third videoconferencing locations which indicate that videoconferencing signals from the first videoconferencing location should be displayed, in response to there being an active talker at the first videoconferencing location.

In 608, the second and third videoconferencing locations may switch to display videoconferencing signals from the first videoconferencing location based on the signals which indicate that videoconferencing signals from the first videoconferencing location should be displayed.

In some embodiments (for example, in which each videoconferencing location includes three or more endpoints), an indication that there is an active talker at the first videoconferencing location may also be provided to a third videoconferencing unit at the first videoconferencing location. In this case, the third videoconferencing unit at the first videoconferencing location may also provide signals to corresponding videoconferencing units (e.g., third videoconferencing units) at the second and third videoconferencing locations which indicate that videoconferencing signals from the first videoconferencing location should be displayed, e.g., in response to there being an active talker at the first videoconferencing location.

In 652, of FIG. 6B, the videoconference may be established (e.g., at a first videoconferencing location) between at least three videoconferencing locations. Similarly as described above, at least the first videoconferencing location, and in some embodiments each of the videoconferencing locations, may include multiple endpoints. Each endpoint at the first location may include a corresponding audio input. The audio inputs may be coupled to a mixer (e.g., an audio mixer), which may be coupled to the videoconferencing units of the first location. Other respective locations may include similar or different audio configurations.

In 654, each audio input, e.g., at the first location, may receive a respective audio input signal. The audio inputs may be unidirectional, e.g., may be configured to receive audio input signals only from a specific area of the videoconferencing location. Furthermore, in some embodiments, the audio inputs at the first location may be configured such that the audio coverage areas of the audio inputs at the first location may include minimal or no overlap, such that an audio input signal received by a first audio input at the first videoconferencing location may substantially not be received by a second audio input at the first videoconferencing location, even if the first and second audio input are located in relatively close proximity to each other.

In 656, the audio input signals from the audio inputs at the first location may be provided to the mixer, e.g., at the first location. The mixer may thus receive the audio input signals and mix the received audio input signals to produce a mixed audio signal. The mixed audio signal may retain information indicating that respective portions of the mixed audio signal are received from respective ones of the plurality of audio inputs.

In 658, the mixed audio signal may be provided to each of the plurality of videoconferencing units at the first videoconferencing location. In some embodiments, provision of the mixed audio signal to each of the plurality of videoconferencing units may be performed directly by the mixer. For example, the mixer may be coupled to each of the videoconferencing units. Alternatively, in some embodiments the mixer may provide the mixed audio signal to a subset (e.g., one) of the videoconferencing, which may provide the mixed audio signal to the remaining videoconferencing units at the first videoconferencing location.

Thus, the first videoconferencing unit at the first videoconferencing location may receive an audio input signal from a first videoconference participant.

In 660, the first videoconferencing unit at the first videoconferencing location may determine that the portion of the mixed audio signal received from the audio input corresponding to the first videoconferencing unit includes the audio input signal from the first participant. In response to this determination, the first videoconferencing unit at the first videoconferencing location may then provide signals to corresponding videoconferencing units at the second and third videoconferencing locations which indicate that videoconferencing signals from the first videoconferencing unit at the first videoconferencing location should be displayed, e.g., in response receiving the audio input signal from the first participant.

In 662, the corresponding videoconferencing units (e.g., corresponding to the first videoconferencing unit at the first videoconferencing location) at the second and third videoconferencing locations may switch their respective displays to display videoconferencing signals from the first videoconferencing unit at the first videoconferencing location, e.g., based on the signals which indicate that videoconferencing signals from the first videoconferencing unit at the first videoconferencing location should be displayed.

In some embodiments, each respective one of the plurality of videoconferencing units at the first videoconferencing location (e.g., including the first videoconferencing unit, as described above) may determine whether the portion of the mixed audio signal from a corresponding respective audio input includes an audio input signal from a conference participant. Thus, if the audio input signal from the first participant is received by the audio input corresponding to the first videoconferencing unit at the first videoconferencing location, any other videoconferencing units at the first videoconferencing location may determine that their corresponding respective audio inputs did not receive the audio input signal from the first participant. Accordingly, videoconferencing units at the second and third videoconferencing locations which do not correspond to the first videoconferencing unit at the first videoconferencing location (e.g., videoconferencing units at the second and third videoconferencing locations which correspond to other videoconferencing units at the first videoconferencing location) may not receive signals indicating that videoconferencing signals from the first videoconferencing unit at the first videoconferencing location should be displayed from the first videoconferencing location in response to the first videoconferencing unit receiving the audio input signal from the first participant. Thus, segment switching may be performed rather than site switching.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for performing a videoconference, the method comprising:

establishing, at a first videoconferencing location, a videoconference between at least three videoconferencing locations, where the at least three videoconferencing locations comprise the first videoconferencing location, a second videoconferencing location, and a third videoconferencing location, wherein each videoconferencing location maintains a respective corresponding plurality of endpoints, each endpoint comprising a respective at least one display, a respective at least one video input, and a respective videoconferencing unit, wherein the respective videoconferencing unit of each endpoint is configured to communicate only with the respective videoconferencing unit of the corresponding endpoint at each of the other videoconferencing locations, comprising a first videoconferencing unit of a first endpoint at the first videoconferencing location communicating only with first videoconferencing units of corresponding first endpoints at the second and third videoconferencing locations, and a second videoconferencing unit of a second endpoint at the first videoconferencing location communicating only with second videoconferencing units of corresponding second endpoints at the second and third videoconferencing locations;

receiving, at the first videoconferencing unit of the first endpoint at the first videoconferencing location, an audio input signal from a first participant at the first videoconferencing location, wherein receiving the audio input signal from the first participant provides an indication to the first videoconferencing unit of the first endpoint at the first videoconferencing location that there is an active talker at the first videoconferencing location;

providing an indication to the second videoconferencing unit of the second endpoint at the first videoconferencing location that there is an active talker at the first videoconferencing location;

providing, by the first and second videoconferencing units of the first and second endpoints at the first videoconferencing location, signals to respective first and second videoconferencing units of corresponding the first and second endpoints at the second and third videoconferencing locations which indicate that videoconferencing signals from the first videoconferencing location should be displayed, in response to there being an active talker at the first videoconferencing location;

switching, at the second and third videoconferencing locations, to display videoconferencing signals from the first videoconferencing location based on the signals which indicate that videoconferencing signals from the first videoconferencing location should be displayed, wherein said switching configures the first videoconferencing units of the first endpoints at the second and third videoconferencing locations to display the videoconferencing signals from the first videoconferencing unit of the first endpoint at the first videoconferencing location, and configures the second videoconferencing units of the second endpoints at the second and third videoconferencing locations to display the videoconferencing signals from the second videoconferencing unit of the second endpoint at the first videoconferencing location.

2. The method of claim 1, wherein each of the respective videoconferencing units at each of the at least three locations does not comprise dedicated multipoint control unit hardware.

3. The method of claim 1,
wherein the indication provided to the second videoconferencing unit of the second endpoint at the first videoconferencing location that there is an active talker at the first videoconferencing location is provided by the first videoconferencing unit of the first endpoint at the first videoconferencing location in response to receiving the audio input from the first participant.

4. The method of claim 3,
wherein the indication provided by the videoconferencing unit of the first endpoint at the first videoconferencing location to the videoconferencing unit of the second endpoint at the first videoconferencing location is an interrupt signal.

5. The method of claim 1, further comprising:
receiving, at the second videoconferencing unit of the second endpoint at the first videoconferencing location, the audio input from the first participant, wherein receiving the audio input from the first participant provides the indication to the second videoconferencing unit of the second endpoint at the first videoconferencing location that there is an active talker at the first videoconferencing location.

6. The method of claim 1, wherein each videoconferencing location further comprises a plurality of audio inputs coupled to a mixer, the method further comprising:
receiving, by a first audio input of the plurality of audio inputs, the audio input signal from the first participant;
providing, by the first audio input, the audio input signal from the first participant to the mixer;
wherein the audio input signal from the first participant is received by the first videoconferencing unit of the first endpoint at the first videoconferencing location via the mixer.

7. The method of claim 1, further comprising:
the first and second videoconferencing units of the first and second endpoints at the first videoconferencing location selectively displaying, on their respective displays, videoconferencing information from respective ones of the first and second videoconferencing units of corresponding first and second endpoints at other respective locations, based on audio output from the other respective locations.

8. The method of claim 1, wherein establishing the videoconference comprises:
the first videoconferencing unit of the first endpoint at the first videoconferencing location acting as a first videoconference host for first videoconferencing units of the corresponding first endpoints at the second and third videoconferencing locations;
the second videoconferencing unit of the second endpoint at the first videoconferencing location acting as a second videoconference host for second videoconferencing units of the corresponding second endpoints at the second and third videoconferencing locations.

9. The method of claim 1,
providing an indication to a third videoconferencing unit of a third endpoint at the first videoconferencing location that there is an active talker at the first videoconferencing location;
providing, by the third videoconferencing unit of the third endpoint at the first videoconferencing location, signals to respective third videoconferencing units of corresponding third endpoints at the second and third videoconferencing locations which indicate that videoconferencing signals from the first videoconferencing location should be displayed, in response to there being an active talker at the first videoconferencing location.

10. A videoconferencing system for use at a first videoconferencing location, the videoconferencing system comprising:
a plurality of endpoints, each endpoint comprising:
a respective videoconferencing unit;
a respective at least one display coupled to the respective videoconferencing unit;
a respective at least one video input coupled to the respective videoconferencing unit; and
one or more audio inputs coupled to one or more of the respective videoconferencing units of the plurality of endpoints;
wherein the videoconferencing system is configured to couple to a plurality of remote videoconferencing locations to perform a videoconference between the first videoconferencing location and the plurality of remote videoconferencing locations, wherein the respective videoconferencing unit of each endpoint is configured to communicate only with respective videoconferencing units of corresponding endpoints at each of the other videoconferencing locations, comprising a first videoconferencing unit of a first endpoint at the first videoconferencing location communicating only with first videoconferencing units of corresponding first endpoints at each of the remote videoconferencing locations, and a second videoconferencing unit of a second endpoint at the first videoconferencing location communicating only with second videoconferencing units of corresponding second endpoints at each of the remote videoconferencing locations;
wherein the first videoconferencing unit of the first endpoint of the plurality of videoconferencing endpoints is configured to receive audio input from a first participant via a first audio input of the one or more audio inputs, wherein receiving the audio input from the first participant provides an indication to the first videoconferencing unit of the first endpoint that there is an active talker at the first videoconferencing location;
wherein the videoconferencing system is configured to provide an indication to the second videoconferencing unit of the second endpoint of the plurality of endpoints that there is an active talker at the first videoconferencing location in the event that audio input from the first participant is received;
wherein the first and second videoconferencing units of the first and second endpoints are configured to provide signals to first and second videoconferencing units of the corresponding first and second endpoints at the remote videoconferencing locations which indicate that videoconferencing signals from the first videoconferencing location should be displayed, in response to there being an active talker at the first videoconferencing location.

11. The videoconferencing system of claim 10,
wherein the videoconferencing system does not comprise dedicated multipoint control unit hardware.

12. The videoconferencing system of claim 10,
wherein the first videoconferencing unit of the first endpoint is configured to provide the indication to the second videoconferencing unit of the second endpoint that there is an active talker at the first videoconferencing location in response to receiving the audio input from the first participant.

13. The videoconferencing system of claim 12,
wherein the first videoconferencing unit of the first endpoint is configured to provide an interrupt signal as the indication that there is an active talker at the first videoconferencing location to the second videoconferencing unit of the second endpoint at the first videoconferencing location.

14. The videoconferencing system of claim 10,
wherein the second videoconferencing unit of the second endpoint is also configured to receive the audio input from the first participant, wherein receiving the audio input from the first participant provides the indication to the second videoconferencing unit of the second endpoint at the first videoconferencing location that there is an active talker at the first videoconferencing location.

15. The videoconferencing system of claim 10, further comprising:
a mixer coupled one or more of the respective videoconferencing units;
wherein the one or more audio inputs comprise a plurality of audio inputs coupled to the mixer, wherein the mixer is configured to provide a mixed audio signal to at least the first videoconferencing unit of the first endpoint.

16. The videoconferencing system of claim 10, wherein the videoconferencing system is configured to perform the videoconference by:
the first and second videoconferencing units of the first and second endpoints at the first videoconferencing location selectively displaying, on their respective displays, videoconferencing information from respective ones of the first and second videoconferencing units of corresponding first and second endpoints at the remote videoconferencing locations, based on audio output from the other respective locations.

17. The videoconferencing system of claim 10,
wherein the first videoconferencing unit of the first endpoint is configured to act as a first videoconference host for respective first videoconferencing units of the corresponding first endpoints at the second and third videoconferencing locations;
wherein the second videoconferencing unit of the second endpoint is configured to act as a second videoconference host for second videoconferencing units of the corresponding second endpoints at the second and third videoconferencing locations.

18. The videoconferencing system of claim 10,
wherein the videoconferencing system is configured to provide an indication to a third videoconferencing unit of a third endpoint of the plurality of videoconferencing endpoints that there is an active talker at the first videoconferencing location in the event that audio input from the first participant is received;
wherein the third videoconferencing unit of the third endpoint is configured to provide signals to third videoconferencing units of corresponding third endpoints at the remote videoconferencing locations which indicate that videoconferencing signals from the first videoconferencing location should be displayed, in response to there being an active talker at the first videoconferencing location.

19. A method for performing a videoconference, the method comprising:
establishing, at a first videoconferencing location, a videoconference between at least three videoconferencing locations, where the at least three videoconferencing locations comprise the first videoconferencing location, a second videoconferencing location, and a third videoconferencing location, wherein each videoconferencing location maintains a respective corresponding plurality of endpoints, each endpoint comprising a respective at least one display, a respective at least one video input, a respective at least one audio input, and a respective videoconferencing unit, wherein the respective videoconferencing unit of each endpoint is configured to communicate only with the respective videoconferencing unit of the corresponding endpoint at each of the other videoconferencing locations, comprising a first videoconferencing unit of a first endpoint at the first videoconferencing location communicating only with first videoconferencing units of corresponding first endpoints at the second and third videoconferencing locations, and a second videoconferencing unit of a second endpoint at the first videoconferencing location communicating only with second videoconferencing units of corresponding second endpoints at the second and third videoconferencing locations;
receiving, at the first videoconferencing unit of the first endpoint at the first videoconferencing location, an audio input signal from a first participant;
providing, by the first videoconferencing unit of the first endpoint at the first videoconferencing location, signals to respective videoconferencing units of corresponding first endpoints at the second and third videoconferencing locations which indicate that videoconferencing signals from the first videoconferencing unit of the first endpoint at the first videoconferencing location should be displayed, in response receiving the audio input signal from the first participant;
wherein the first videoconferencing units of corresponding first endpoints at the second and third videoconferencing locations switch their respective displays to display videoconferencing signals from the first videoconferencing unit of the first endpoint at the first videoconferencing location based on the signals which indicate that videoconferencing signals from the first videoconferencing unit of the first endpoint at the first videoconferencing location should be displayed;
wherein respective videoconferencing units of endpoints at the second and third videoconferencing locations which do not correspond to the first endpoint at the first videoconferencing location do not receive signals indicating that videoconferencing signals from the first videoconferencing unit of the first endpoint at the first videoconferencing location should be displayed from the first videoconferencing location in response to the first videoconferencing unit of the first endpoint receiving the audio input signal from the first participant.

20. The method of claim 19, further comprising:
receiving, at a mixer, an audio input signal from each of the audio inputs, wherein the received audio input signals include the audio input signal from the first participant;
mixing, by the mixer, the received audio input signals to produce a mixed audio signal, wherein the mixed audio signal retains information indicating that respective portions of the mixed audio signal are received from respective ones of the audio inputs;
providing the mixed audio signal to each of the respective videoconferencing units;
determining, by each respective videoconferencing unit, whether a respective portion of the mixed audio signal from a corresponding respective audio input comprises an audio input signal from a conference participant;
wherein the first videoconferencing unit of the first endpoint providing the signals which indicate that videoconferencing signals from the first videoconferencing unit of the first endpoint at the first videoconferencing location should be displayed to respective videoconferencing units of corresponding endpoints at the second and third videoconferencing locations is performed in response to the first videoconferencing unit of the first endpoint determining that the portion of the mixed audio signal received from an audio input corresponding to the first videoconferencing unit of the first endpoint comprises the audio input signal from the first participant.

* * * * *